(12) United States Patent
Gebauer et al.

(10) Patent No.: US 9,068,612 B2
(45) Date of Patent: Jun. 30, 2015

(54) AXIALLY AND RADIALLY COOLED BRAKE DISK WITH COVER

(75) Inventors: Marek Gebauer, Březová (CZ); Zbyněk Lorenčuk, Opava-Kateřinky (CZ)

(73) Assignee: VSB-TECHNIAL UNIVERSITY OF OSTRAVA, Ostrava-Poruba (CZ)

( * ) Notice: Subject to any disclaimer, the term of this patent is extended or adjusted under 35 U.S.C. 154(b) by 0 days.

(21) Appl. No.: 13/806,399

(22) PCT Filed: Jul. 11, 2011

(86) PCT No.: PCT/CZ2011/000068
§ 371 (c)(1),
(2), (4) Date: Dec. 21, 2012

(87) PCT Pub. No.: WO2012/010108
PCT Pub. Date: Jan. 26, 2012

(65) Prior Publication Data
US 2013/0092486 A1    Apr. 18, 2013

(30) Foreign Application Priority Data

Jul. 19, 2010   (CZ) .......................... PUV 2010-22988

(51) Int. Cl.
*F16D 65/00* (2006.01)
*F16D 65/12* (2006.01)
*F16D 65/847* (2006.01)
*F16D 55/00* (2006.01)
*F16D 65/02* (2006.01)

(52) U.S. Cl.
CPC ............ *F16D 65/128* (2013.01); *F16D 65/847* (2013.01); *F16D 2055/0037* (2013.01); *F16D 2065/1316* (2013.01); *F16D 2065/1328* (2013.01)

(58) Field of Classification Search
USPC .............. 188/218 A, 218 R, 218 XL; 301/6.3
See application file for complete search history.

(56) References Cited

U.S. PATENT DOCUMENTS 6,155,650 A * 12/2000 Barger ........................... 301/6.3
2002/0084150 A1 * 7/2002 Lee ............................... 188/71.6

(Continued)

FOREIGN PATENT DOCUMENTS

DE    9309234 U1    11/1994
DE    9319056 U1    4/1995

(Continued)

*Primary Examiner* — Christopher Schwartz
(74) *Attorney, Agent, or Firm* — Tarolli, Sundheim, Covell & Tummino LLP (57) ABSTRACT

Brake disk contains through channels (7) running across primary vanes (4) skewly to the inter-vane space (5). At least part of the brake disk body (1) is equipped with a static cover (8) in which a system of secondary vanes (9) is located. Channels (7) are preferably arranged in rows, where they have a bore increasing with increasing distance from the brake disk centre. The secondary vanes (9) are in the number of at least the number of primary vanes (4) and their impact surfaces (10) are directed against the cooling air flow direction. Primary vanes (4) and secondary vanes (9) are bent, but inversely. There are primary gaps between secondary vanes (9) and circumferential wall (13) of a cover (8), and secondary gap inter-connected with primary gaps is between the brake disk and supporting wall (11) of the cover (8). Space around the brake disk body (1) is interconnected with channels (7) and led out through the wheel disk outside the wheel.

9 Claims, 9 Drawing Sheets

(56) References Cited

U.S. PATENT DOCUMENTS

2005/0016798 A1* 1/2005 Sabelstrom et al. ......... 188/71.6
2007/0181390 A1   8/2007 Korm

FOREIGN PATENT DOCUMENTS

EP    1298342 A2   4/2003
WO    9829671 A1   7/1998

* cited by examiner

AXIALLY AND RADIALLY COOLED BRAKE DISK WITH COVER

RELATED APPLICATIONS

This application is a National Phase filing of PCT/CZ2011/000068, filed Jul. 11, 2011, and claims priority to Application No. 2010-22988, filed Jul. 19, 2010, the subject matter of which are incorporated herein by reference in their entirety.

TECHNICAL FIELD

The technical solution relates to structural design of axially and radially cooled brake disk with cover especially suitable for formula, racing and sports cars, aircrafts and other equipment containing disk brakes with an extremely high need for cooling.

BACKGROUND ART

Brake systems for vehicles and other equipment with rotating wheels now widely include brake disks (also called rotors in U.S. English), which are located behind the wheel disk where they are attached to the wheel hub and fitted with brake lining. During braking, intense friction between the brake disk and the respective friction lining creates a significant amount of thermal energy, which causes a significant increase in temperature, especially of the brake disk. Excessive increase in temperature can cause serious defects of the brake system, which also reduces the operational safety of the vehicle or the given equipment operation. It may in particular result in shape distortion and even warping of the brake disk, brake disk rupture or melting. Fixing these defects or their prevention is connected with the need to replace brake disks, brake lining, etc., which represents a considerable cost, time burden and the need for a temporary decommissioning. Therefore, the brake disk cooling issues received considerable attention.

Formula One, racing cars, sports cars and airplanes are devices in which this issue is particularly significant. For these types of transport means, the operating temperature when braking from high speed reaches up to 1000° C., and thus the need for fast and high quality cooling of brake disks is urgent. This are specific equipments, in which case repair may be performed only by dedicated specialized workplaces, and it is therefore necessary either to get supplementary service centre, or drive off long distances for repairs, which increases cost and time requirements for the owner or the operator of these means of transport. Shutdown of operation here is particularly undesirable, and the need for reliability even in extreme loads is particularly high.

Cooling of brake disks is usually achieved by means of directed streams of cooling air. Its supply to the disk is effected through an air catcher, which contains a system of air channels that are emptied into the wheel hub. The wheel hub contains at least one air channel for the passage of air, which is led into the centre of the brake disk. The structural design of brake disks is chosen so as to allow the cooling air flow through the body of the disk. Existing brake disks have no cover and therefore the cooling air flows through them directly into the space of the wheel disk, from where it has a free passage into the ambient space. Throughput (patency) of disks for air is currently achieved by means of axial systems of air channels passing through the solid body of the brake disk or by means of radial vanes created in a hollow disk, where only the space between these vanes is used for the passage of air. Radial vanes are straight or curved.

The abovementioned background art is described briefly for example in the application CZ PV 2006-202 of the Škoda Auto a.s. company. This application proposes to achieve internal cooling of the brake disk by means of three types of channels that are created in the otherwise solid mass of the disk in the shape of a ring, namely axial channels, radial channels, and channels in the shape of a helix coiled around the radial axis o. In this case, brake disk takes the form of a ring, as a body in the shape of annulus between two cylindrical surfaces, i.e. the input cylindrical surface and the output cylindrical surface. The lateral walls of the disk are called there as lateral friction surfaces. The input cylindrical surface, the output cylindrical surface, and lateral friction surfaces are delimiting the body of brake disk. The brake disk is fixed in place of use by means of a flange. The input cylindrical surface and the output cylindrical surface are interconnected by the axis around which the helix is coiled, on which helix the centre of gravity of cross-sectional area of the radial cooling channel is located. Axial channels are connected with radial channels by means of the helix. The disadvantage of this solution is the abovementioned interconnection of all types of channels, because it causes mixing of cooling air streams, hot ones with cold ones, which significantly reduces cooling efficiency.

Construction of a known vane brake disk is described, for example, in CZ Pat. 140297. The brake disk is arranged as two plates having the shape of annular ring, which are connected by means of essentially radial ribs forming there vanes, between which a passage of cooling air is possible in the inter-vane space. There is a significant disadvantage there that the abovementioned design only allows a rectilinear flow of cooling air in the direction radially from the axis of rotation of the brake disk, which results in low cooling efficiency with the need for supply of high quantity of cooling air.

DISCLOSURE OF INVENTION

The above-mentioned disadvantages are eliminated to a considerable extent by the proposed invention.

Axially as well as radially cooled brake disk equipped with cover is invented that is designated as a part of braking system for means of transport with the vane disk brakes, in particular for racing and sports cars including formulas and for aircrafts. The invention significantly enhances the existing brake disk for mounting in the area of wheel hub of the vehicle or other means of transportation, the type where the brake disk has a form of body with two lateral walls of the annulus shape, between which a cavity is located containing a system of vanes, hereinafter called the primary vanes, with inter-vane space. The primary vanes are contained for example in the shape of straight or bent wings, elliptical, etc. The inter-vane space between the vanes creates a heat-exchanging surface and has the shape and dimensions allowing passage of cooling air. This space runs between adjacent vanes from the central part of the brake disk to its circumference. The central area of the brake disk accepts the inlet channel for cooling air, which empties into the inter-vane space. The essence of the new solution is that the brake disk of the above type has in itself created at least one through channel running across its body and emptying with its one end into one lateral wall and with its second end into second lateral wall of the brake disk, and the said channel passes through at least one primary vane of the brake disk, skewly towards the inter-vane space. The condition of the new solution is that simultaneously at least part of the brake disk body is equipped with a static cover containing a system of secondary vanes and said secondary vanes are mounted inside the cover in the space located at the circumference of the brake disk body.

The brake disk has preferably a system of through channels created inside where these channels are in the total number of at least two and are passing through at least one primary vane of the brake disk.

Preferable alternative to the proposed solution is that the channels are located in all primary vanes and in a limit case in the number of at least one channel in each primary vane of the brake disk. However, significantly more preferable is to include more channels in each primary vane, as described hereinafter in more details.

Another limit alternative to the proposed solution is that the channels are located in only one primary vane, but in the number of two or more channels. The channels are preferably located in more or in all of the primary vanes, in the number of at least two channels in at least one primary vane of the brake disk.

Channels that are in the primary vane in the number of two or more are located in the primary vane preferably in a row or rows. On the section across the primary vane, openings of these channels are located in at least one row running in the direction from the centre to the circumference of the brake disk, while the channels have preferably a bore increasing with increasing distance from the centre of the brake disk.

Optimal design of the proposed solution is that the channels are created in all primary vanes of the brake disk, always in at least one row where they have preferably increasing diameter with increasing distance from the centre of the brake disk. There are from 2 to 105 channels in each row.

The number of secondary vanes located in the cover is preferably at least equal to or higher than the number of primary vanes in the brake disk.

The secondary vanes are preferably equipped with impact surfaces that are directed against the direction of the cooling air flow from the inter-vane space.

Both vanes, primary vanes as well as secondary vanes, are preferably bent, and the bending of secondary vanes is preferably oriented in the opposite direction compared to the bending of primary vanes.

The cover comprises supporting wall located preferably on the wheel hub side, circumferential wall located at a distance on the circumference of the brake disk body, and two flanges. The first flange runs out from the circumferential wall around the lateral wall of the brake disk to the lateral side of the brake disk, opposite to the side where the supporting wall is located, and the second flange runs out from the end of the supporting wall towards the remaining lateral wall of the brake disk, both at a distance against the relevant lateral wall of the brake disk.

Secondary vanes are mounted inside the cover preferably by means of fixing their one or both lateral ends to the cover, while at least one primary gap is located between each secondary vane and circumferential wall of the cover, and at least one secondary gap is located between the brake disk and the supporting wall of the cover.

The secondary gap runs alongside the brake disk at least from the orifice of channel located furthest off the centre of the brake disk to the orifice of channel located closest to the centre of the brake disk, while it is interconnected with the primary gap space.

The space around the circumference of the brake disk is preferably interconnected with the space in channels by means of primary and secondary gaps in the cover, while the space in channels is led out through the wheel disk into the free ambient space outside the wheel.

The proposed invention is suitable for brake systems with vane disk brakes in which cooling of brake disks is extremely necessary, in particular for racing cars, sports cars and airplanes. The proposed solution enables simultaneous axial and radial cooling of brake disks, which prevents generation of excessively high temperatures during braking. It substantially improves cooling with air in the brake system. This results in significant increase of operation safety. It allows cooling of other brake components such as calliper, brake lining, etc. This leads to less wear of material and to reduction of material, time and cost demands for repairs and maintenance. This reduces the required number and duration of service outages and limits the number of detours to service checks and repairs. The proposed solution will enable more efficient braking.

BRIEF DESCRIPTION OF DRAWINGS

The invention is illustrated using drawings, where.

BEST MODE OF CARRYING OUT THE INVENTION

Example of embodiment of the invention in the optimum arrangement is the brake system according to FIGS. 1 to 10.

The brake disk has a body 1 created by two parallel lateral walls 2, 3 of the annulus shape, between which a cavity is located containing a system of primary vanes 4 with free inter-vane space 5. In this concrete example embodiment, the body 1 of the brake disk contains inside of it primary vanes 4 from plates in the shape of bent wings placed radially and widening in the direction from the centre of the body 1. The inter-vane space 5 between primary vanes 4 is free, not partitioned within the framework of this brake disk, to allow flowing of cooling air. This inter-vane space 5 runs from the central part of the brake disk to its circumference, where it is freely open outwards. After mounting the brake disk to its place of use, the central area of the brake disk accepts the inlet channel 6 for cooling air, through which the cooling air is supplied into the inter-vane space 5. The body 1 of the brake disk has inside created a system of through channels 7 that are located in primary vanes 4 of the brake disk and are open to lateral walls 2, 3. Each channel 7 is through, starts in the lateral wall 2, passes through the whole primary vane 4 and ends in the second lateral wall 3 of the brake disk. There are several, in this concrete case five, channels 7 in every primary vane 4, and all these channels 7 are skew towards the inter-vane space 5.

Part of the brake disk body 1 is equipped with a static cover 8 containing a system of secondary vanes 9. Secondary vanes 9 are located inside the cover 8, where they are arranged with regular spacing along the circumference near the brake disk.

Figure 5:
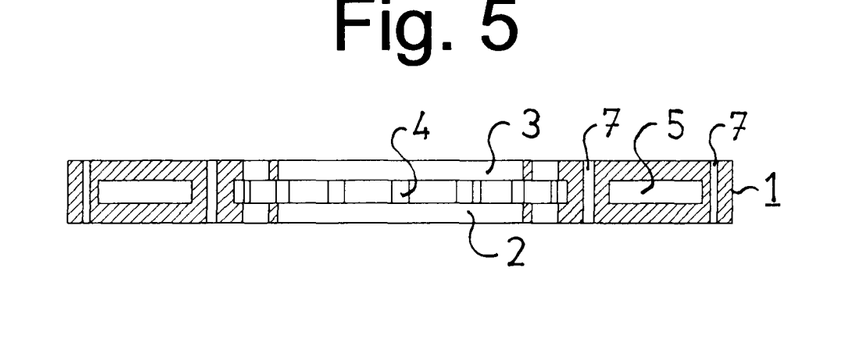
FIG. 5 shows the same brake disk in sectional view.

The channels 7 are situated in row in each primary vane 4. On figures with cross-sectional views of the primary vane 4, it is clearly visible how openings illustrating the passage of channels 7 are always located all in one row running along a curve in the direction from the centre to the circumference of the brake disk, while the channels 7 have a bore increasing with increasing distance from the centre of the brake disk. For the purpose of demonstration, clearly visible shape and size of channels 7 are illustrated on figures; however an optimum in the scope of 2 to $10^5$ channels 7 per row will be significant in practice.

The channels 7 are demonstrated in the clearest and most descriptive variant when they have circular cross-section and are straight and parallel to each other as well as to the axis of the brake disk, however channels 7 with a different cross-section shape and a different course can be used in practice.

Figure 7:
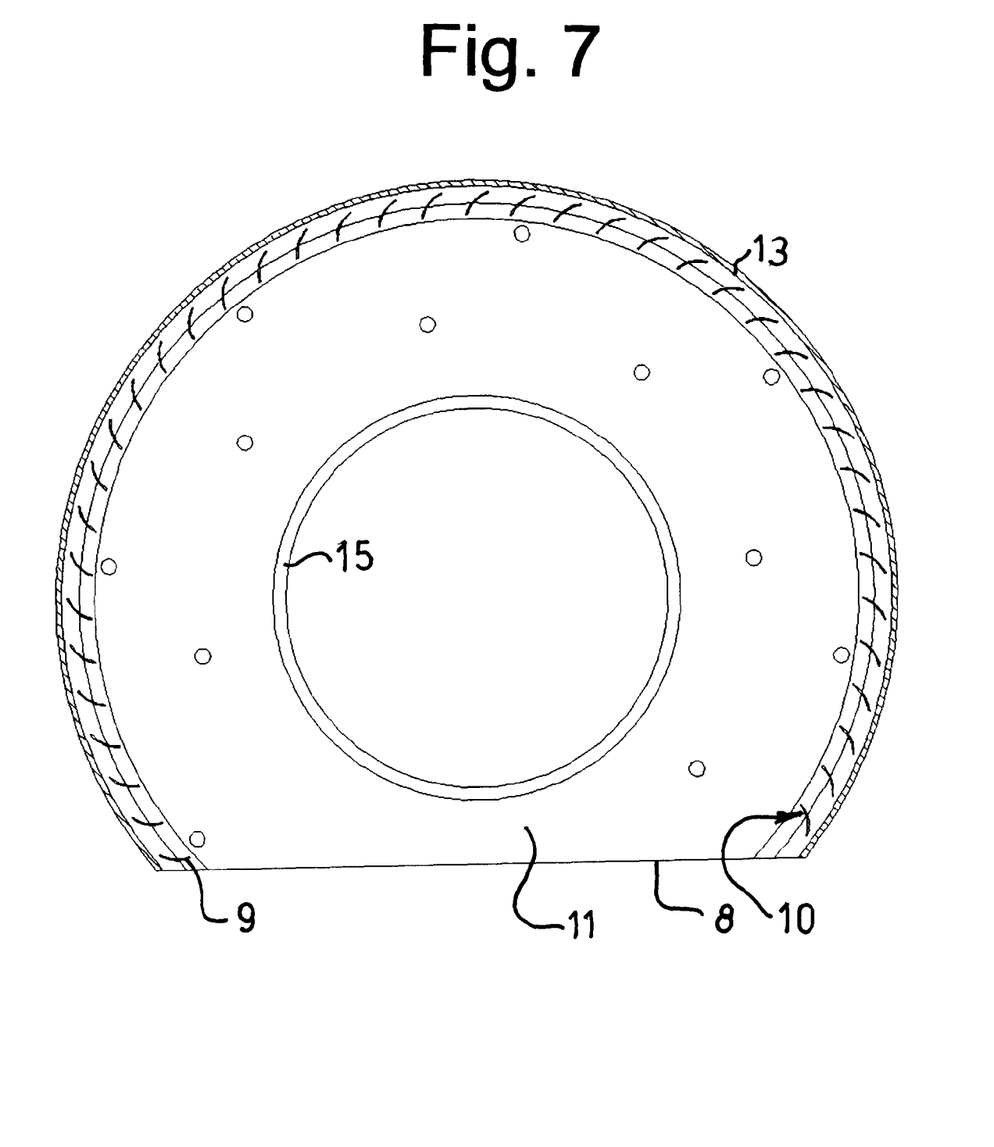
FIG. 7 shows front view inside the same cover, in partial section after cutting off its first flange.
Figure 8:
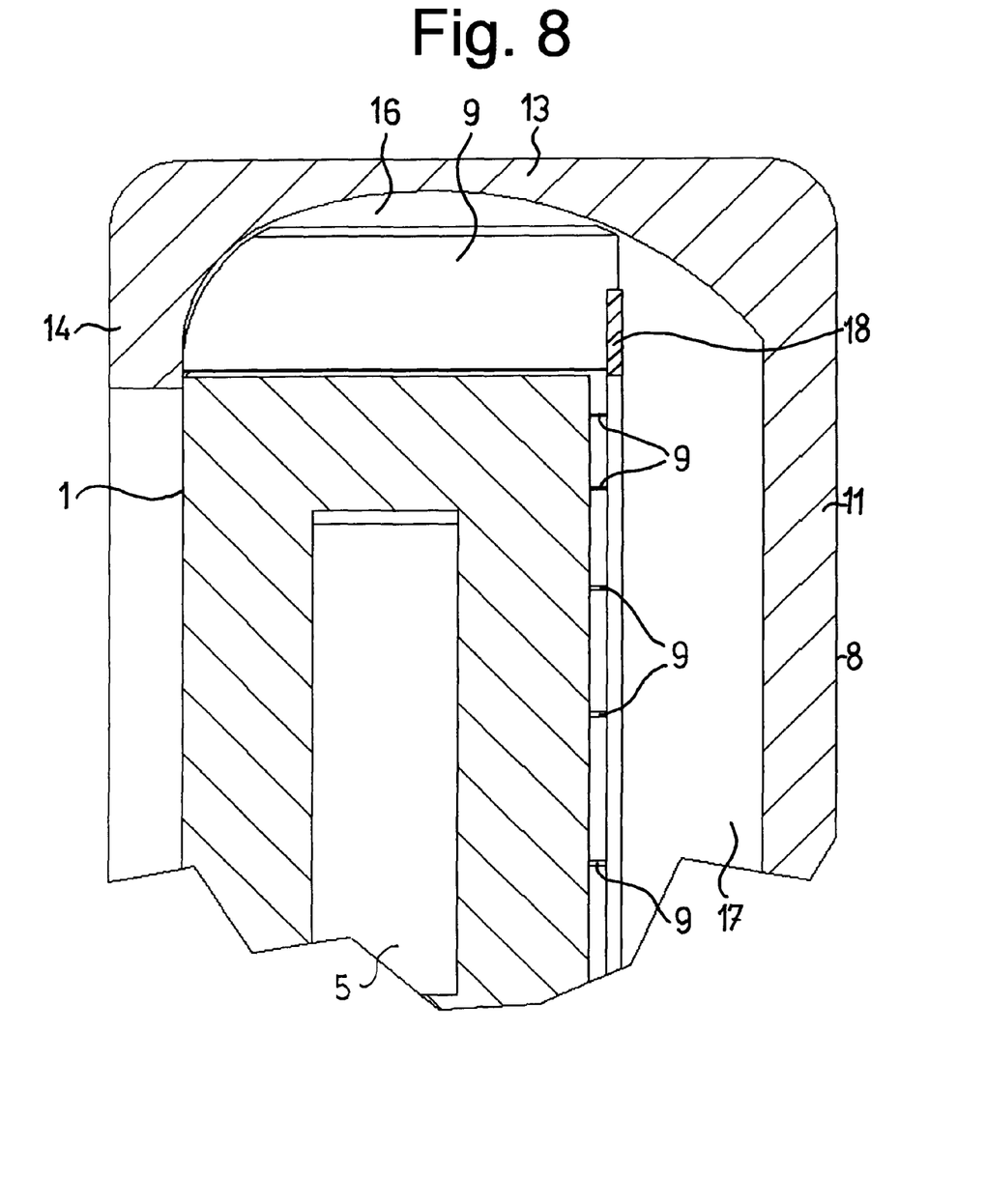
FIG. 8 shows detail demonstrating mounting of the secondary vane in the cover and interconnection of the primary gap with the secondary gap.

The number of secondary vanes 9 in the cover 8 is higher than the number of primary vanes 4 in the brake disk. The secondary vanes 9 are in the shape of bent plates and their impact surfaces 10 are directed against the direction of the cooling air flow from the inter-vane space 5.

Both vanes 4, 9, primary vanes 4 as well as secondary vanes 9, are slightly bent. Bending of secondary vanes 9 is oriented in an opposite way than the bending of primary vanes 4, which results in achieving maximum efficiency of the invented technical solution.

Figure 1:
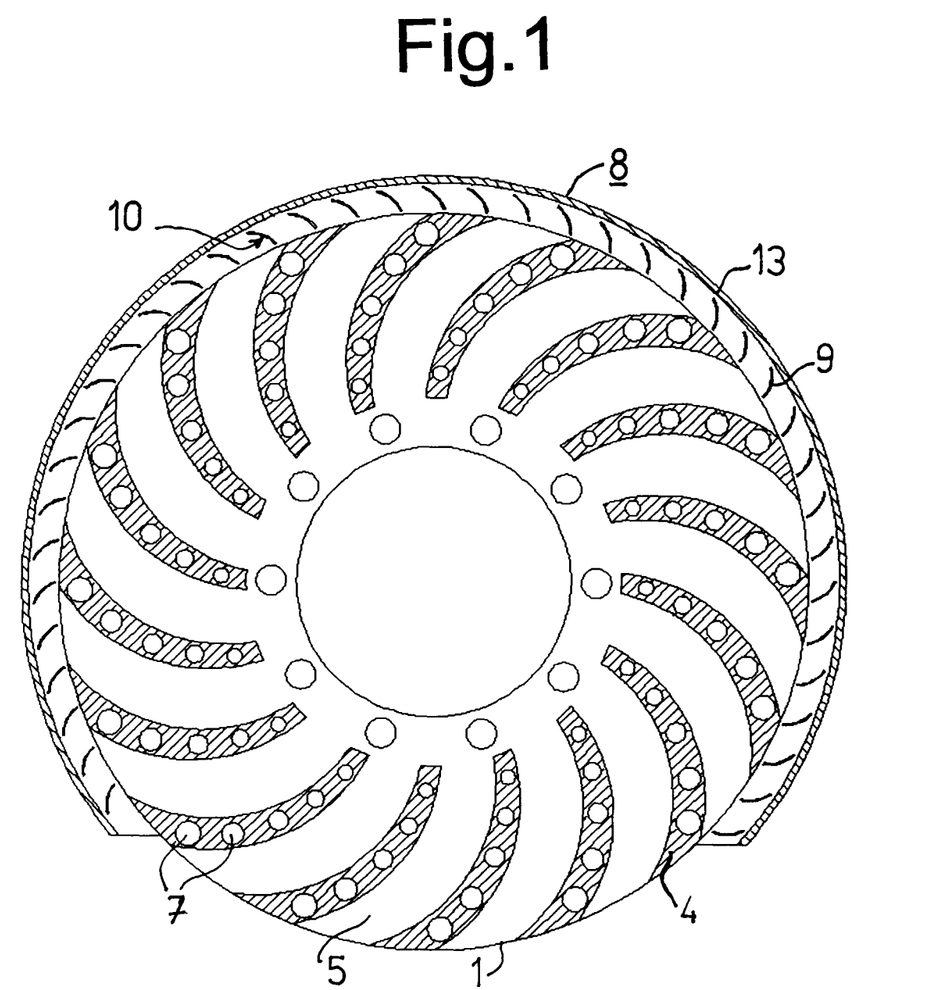
FIG. 1 shows the assembly of the individual exemplary brake disk with cover at the front view on the lateral side of the brake disk uncovered with supporting wall of the cover.
Figure 2:
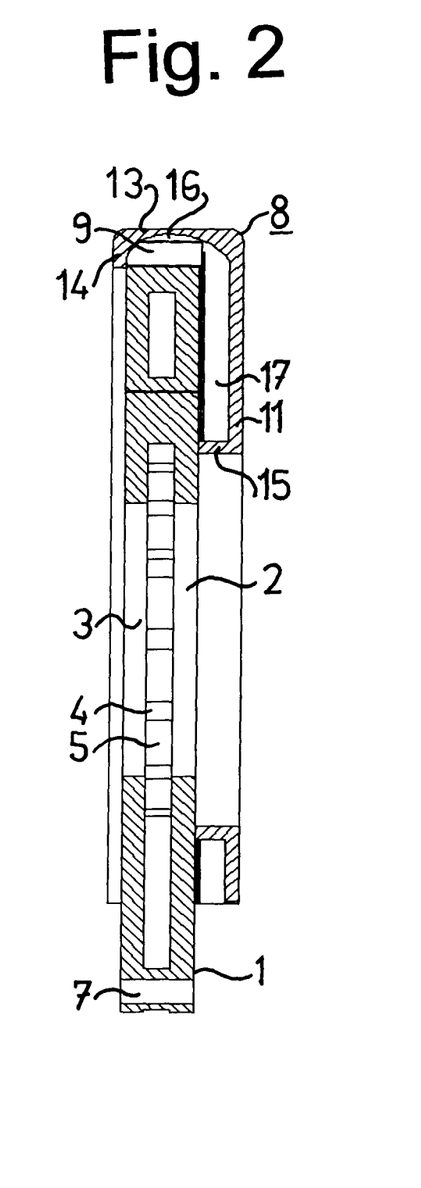
FIG. 2 shows this assembly in sectional view.
Figure 3:
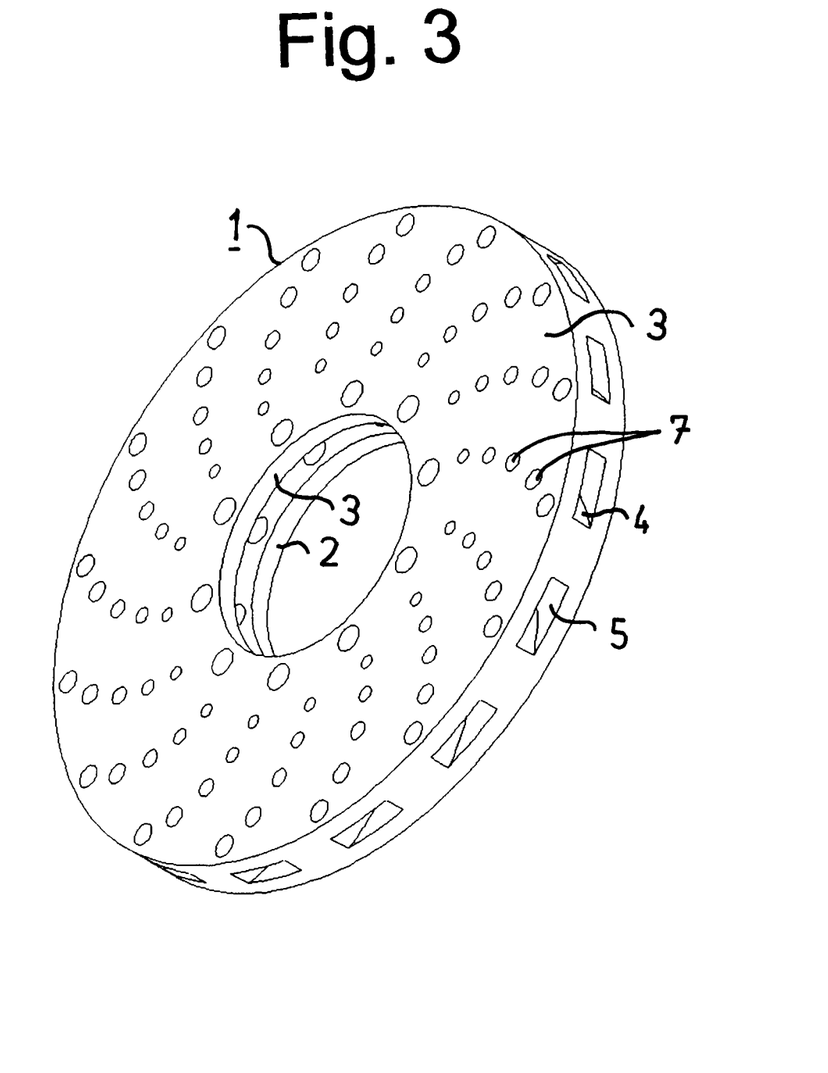
FIG. 3 shows perspective view on the brake disk alone according to the invention.
Figure 4:
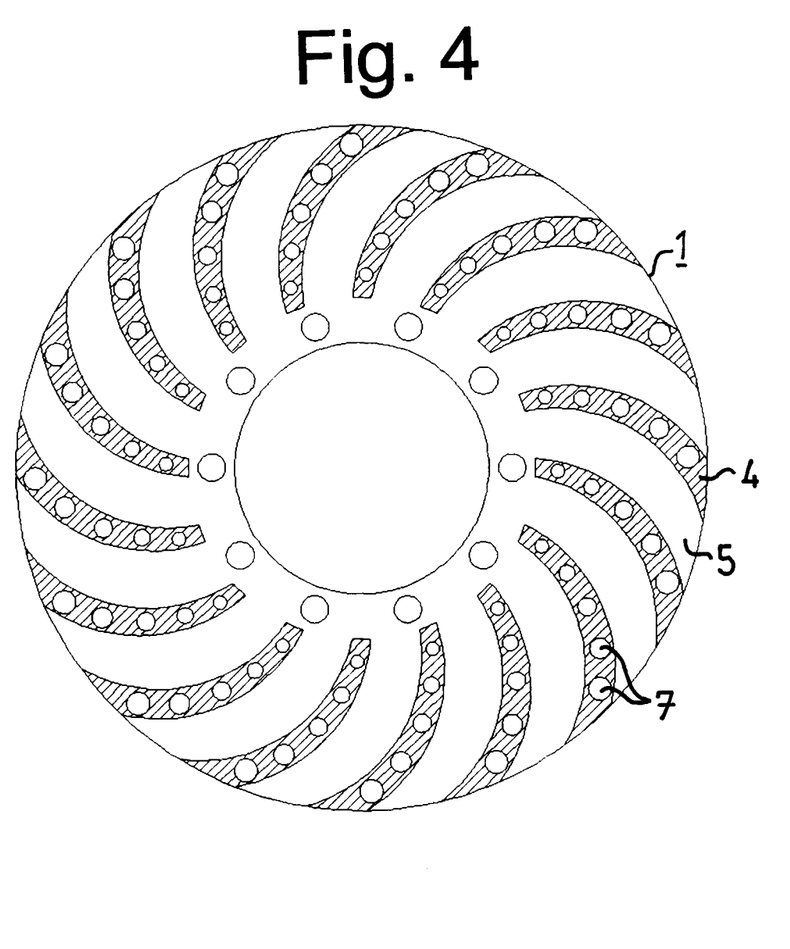
FIG. 4 shows the same brake disk when looking at its one lateral side.
Figure 6:
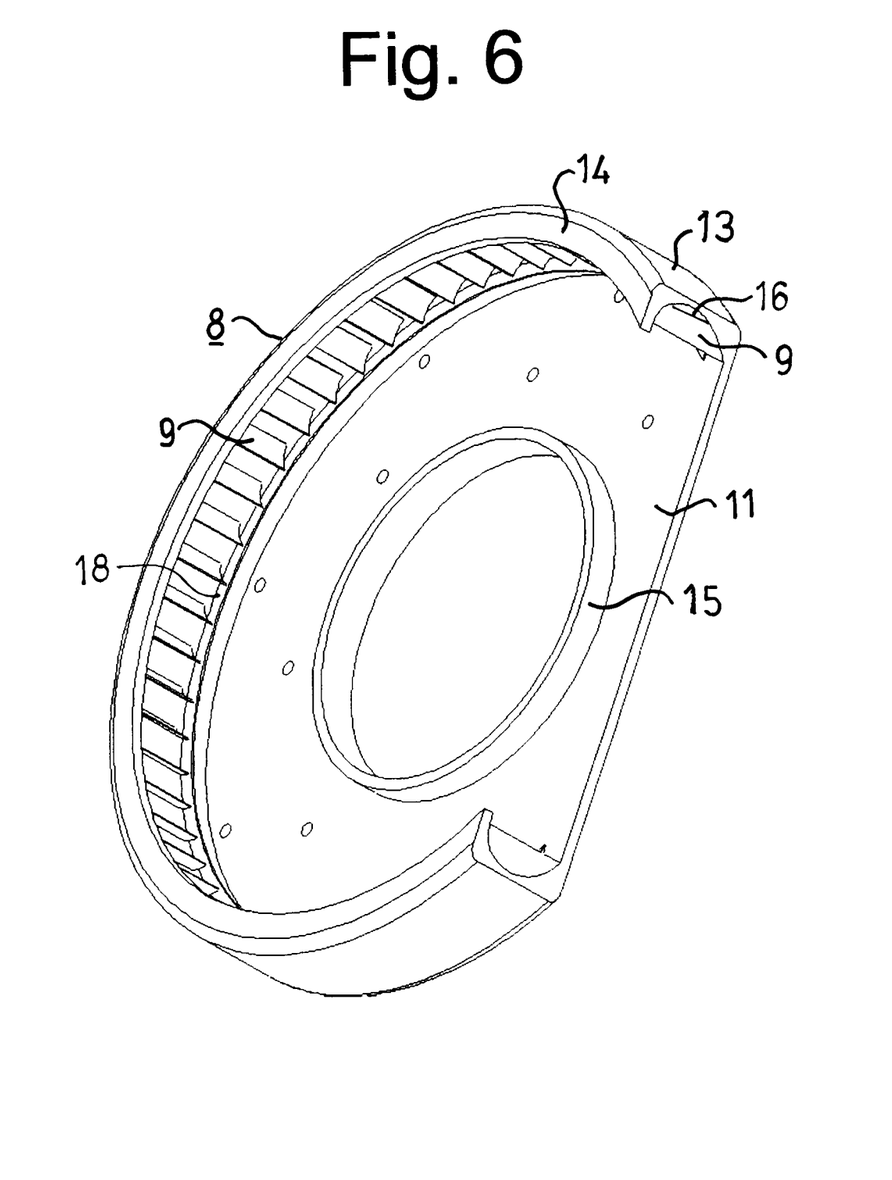
FIG. 6 shows perspective view on example of the cover alone according to the invention.

The cover 8 includes on its one side a lateral extended solid supporting wall 11 allowing mounting of the cover 8 to the wheel hub 12. On its circumferential side, it contains the circumferential wall 13 running at a distance on the circumference around the body 1 of the brake disk. Other significant part of the cover 8 are two flanges 14, 15. The first flange 14 runs out from the circumferential wall 13 around the second lateral wall 3 of the brake disk to the lateral side of the brake disk, opposite to the side where the supporting wall 11 is located. The second flange 15 runs out at the end of the supporting wall 11 towards the first lateral wall 2 of the brake disk, both at a distance against the relevant lateral wall 2, 3 of the brake disk.

Secondary vanes 9 are mounted inside the cover 8 by their lateral ends, while the primary gap 16 is located between each secondary vane 9 and the circumferential wall 13 of the cover 8. The secondary gap 17 is located between the first lateral wall 2 of the brake disk and the supporting wall 11 of the cover 8. This secondary gap 17 runs alongside the first lateral wall 2 of the brake disk at least from the orifice of largest channels 7 located furthest off the centre of the brake disk up to the orifice of smallest channels 7 located closest to the centre of the brake disk, while it is connected with the space of the primary gap 16. This connection is in the given particular case achieved by means of passage past the flow baffle jut 18 on the principle of radial compressor, located inside the cover 8. The flow baffle jut 18 is in the form of a ring section with a surface area in the shape of annular sector, and the lateral ends of secondary vanes 9 are mounted in it. Opposite lateral ends of secondary vanes 9 are mounted directly in the first flange 14 inside the cover 8. The flow baffle jut 18 is hung in the space inside the cover 8, it is held in place by means of secondary vanes 9. Mounting of secondary vanes 9 and interconnection of spaces of the primary gap 16 with the secondary gap, 17 is clearly visible on FIG. 2 and FIG. 8.

The space outside the inter-vane space 5 is enclosed by means of circumferential wall 13 of the cover 8 in the area around the circumference of the body 1 of the brake disk. This space is preferably interconnected with the space in channels 7 by means of primary gap 16 and secondary gap 17 in the cover 8, while the space located in channels 7 is led out through the wheel disk 19 into the free ambient space found outside the wheel of the means of transportation.

Figure 9:
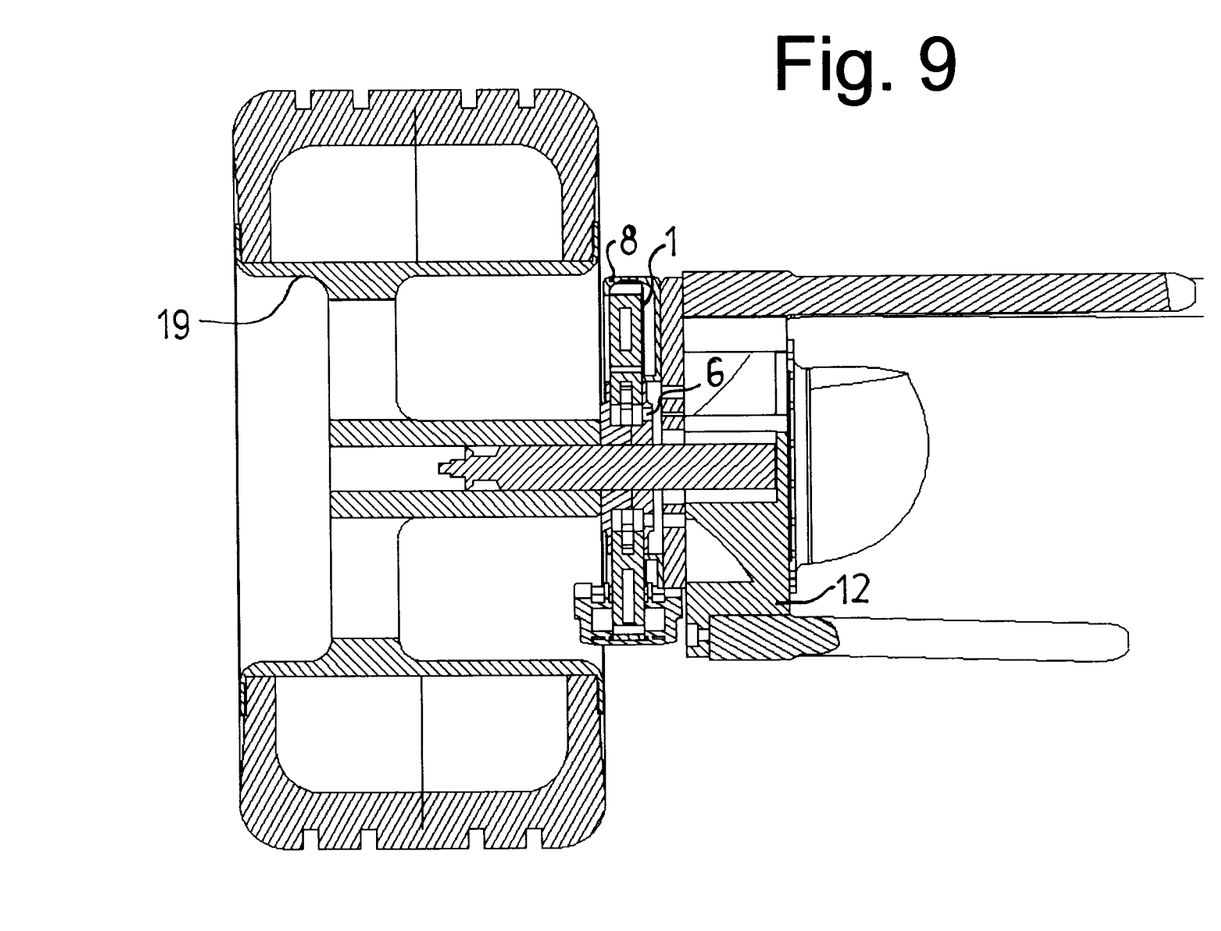
FIG. 9 shows sectional view of a wheel with hub and with the brake disk and cover according to the invention.
Figure 10:
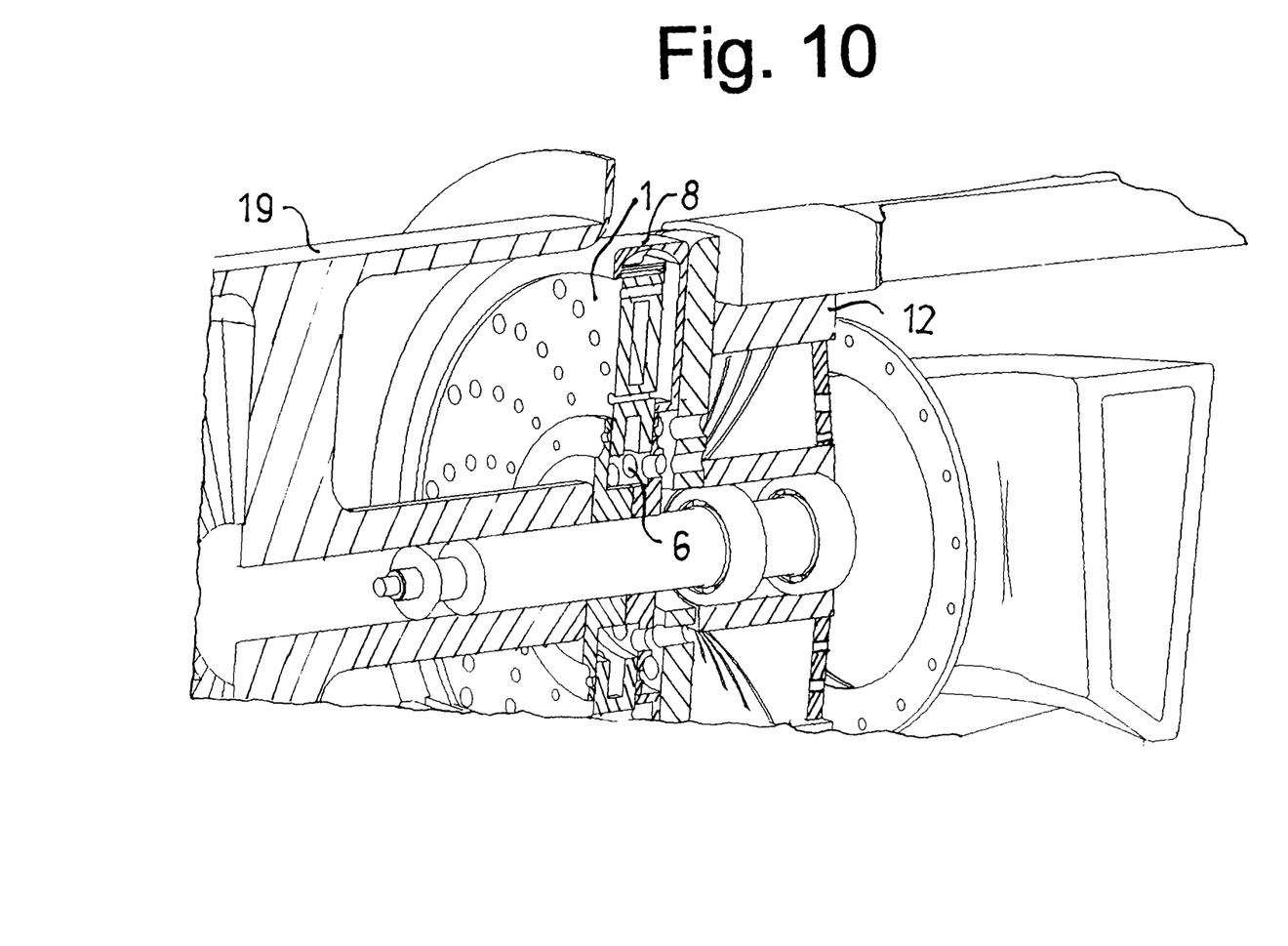
FIG. 10 shows perspective view on the same assembly in partial section.

Function of the invented technical solution is clarified by means of FIGS. 9 and 10.

The brake disk with the body 1 equipped with a system of channels 7 and the cover 8 is mounted behind the wheel disk 19. The cover 8 is mounted on the wheel hub 12. The central area of the brake disk accepts the inlet channel 6 for cooling air, which is led into the inter-vane space 5. The cooling air supplied into the centre of the brake disk by the inlet channel 6 flows into me inter-vane space 5. The cooling air is expelled through the inter-vane space 5 into the circumference of the brake disk due to centrifugal force, by the effect of rotation of the body 1 of the brake disk. High kinetic energy evolves here, which results in high speed and low pressure of the air flow in the area of the brake disk circumference. Air flows between secondary vanes and from here through primary gaps 16 into secondary gaps 17. Before entering the secondary gaps 17, the air acquires lower speed and higher pressure. The air flows from the secondary gaps 17 into the channels 7 and through the wheel disk 19 outwards into the free ambient space. This ensures permanent flow of cooling air in the brake system during movement of the brake disk.

The invention claimed is:

1. Axially and radially cooled brake disk and cover for a braking system and for mounting between a wheel disk and a wheel hub, where the brake disk is rotating, comprising: a body with first and second lateral walls in an annular shape, between which a cavity is located containing a system of primary vanes with an inter-vane space allowing passage of cooling air and running from a central part of the brake disk to its circumference, wherein the central part of the brake disk accepts an inlet channel for cooling air, which is led out into the inter-vane space, the brake disk including a system of through channels running across its body, each through channel including a first end that empties into the first lateral wall and a second end that empties into the second lateral wall, and the through channels are in the number of at least two and are passing through the primary vanes of the brake disk skewing towards the inter-vane space, wherein the cover contains a system of secondary vanes located outside the brake disk, wherein the cover comprises a supporting wall located on the wheel hub side, a circumferential wall located at a distance on the circumference of the brake disk body, and first and second flanges from which the first flange runs out from the circumferential wall towards the second lateral wall of the brake disk and the second flange runs out from an end of the supporting wall towards the first lateral wall of the brake disk, wherein the secondary vanes are mounted inside the cover and fix at least one lateral end to the cover, wherein at least one primary gap is located between each secondary vane and the circumferential wall of the cover, and at least one secondary gap is located between the brake disk and the supporting wall of the cover, and the primary vanes as well as the secondary vanes are bent, wherein bending of the secondary vanes is oriented in an opposite way compared to bending of the primary vanes and the secondary vanes have impact surfaces directed against direction of the cooling air flow from the inter-vane space.

2. Axially and radially cooled brake disk and cover according to claim 1, wherein the secondary gap runs alongside the brake disk from the through channel located furthest off a centre of the brake disk up to the through channel located closest to the centre of the brake disk, wherein the secondary gap is connected to the primary gap.

3. Axially and radially cooled brake disk and cover according to claim 2, wherein space around the outer circumference of the brake disk body is interconnected with the through channels by means of the primary gap and the secondary gap and the through channels lead out through the wheel disk into free ambient space outside a wheel.

4. Axially and radially cooled brake disk and cover according to claim 3, wherein at least one through channel is in all primary vanes of the brake disk.

5. Axially and radially cooled brake disk and cover according to claim 3, wherein at least two through channels are in at least one primary vane of the brake disk.

6. Axially and radially cooled brake disk and cover according to claim 5, wherein the through channels are located in at least one primary vane in at least one row so that on a cross-section through the at least one primary vane, openings of the through channels are located in a row running in a direction of a course of at least one primary vane from the centre to the circumference of the brake disk, while a bore of the through channels is increasing as the distance from the centre of the brake disk increases.

7. Axially and radially cooled brake disk and cover according to claim 6, wherein the through channels have increasing bore diameters with increasing distance from the centre of the brake disk, while there are from 2 to $10^5$ channels in each row.

8. Axially and radially cooled brake disk and cover according to claim 7, wherein the number of secondary vanes in the cover is at least the same as the number of primary vanes in the brake disk.

9. Axially and radially cooled brake disk and cover according to claim 7, wherein the first flange of the cover runs around the second lateral wall of the brake disk to a lateral side of the brake disk, opposite to a side where the supporting wall is located, and the second flange runs towards the first lateral wall of the brake disk.

* * * * *